F. E. RALEIGH.
MIXER AND SPREADER FOR CONCRETE AND OTHER PLASTIC MATERIALS.
APPLICATION FILED FEB. 21, 1908.
1,142,841.
Patented June 15, 1915.
4 SHEETS—SHEET 1.
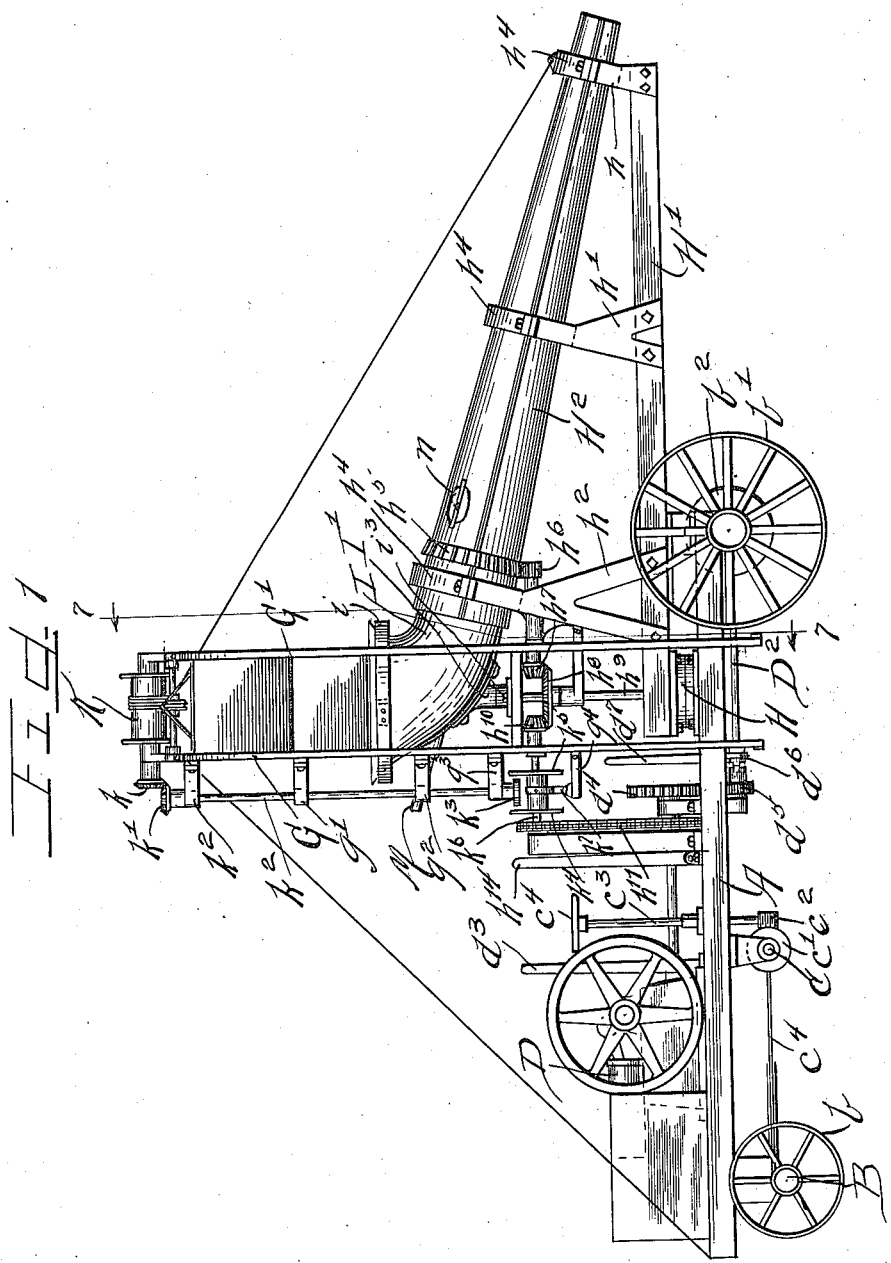

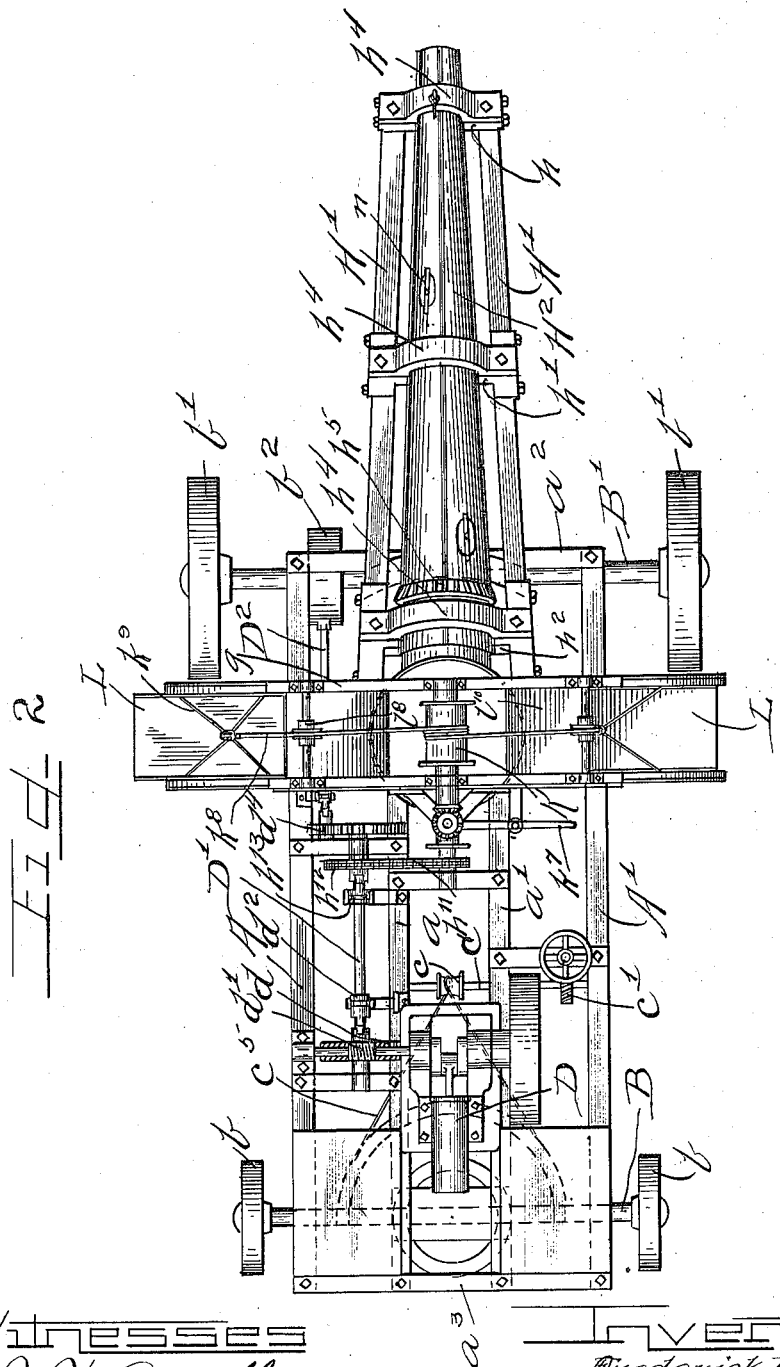

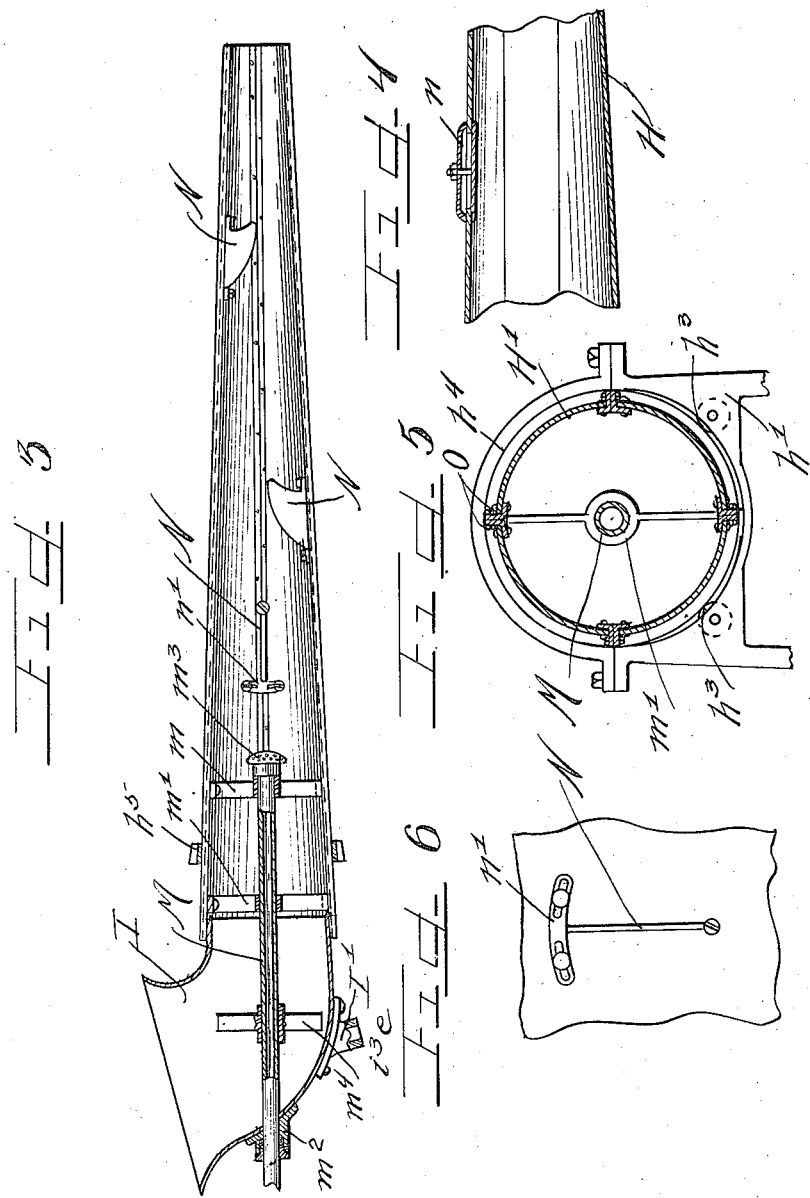

F. E. RALEIGH.
MIXER AND SPREADER FOR CONCRETE AND OTHER PLASTIC MATERIALS.
APPLICATION FILED FEB. 21, 1908.
1,142,841.
Patented June 15, 1915.
4 SHEETS—SHEET 4.
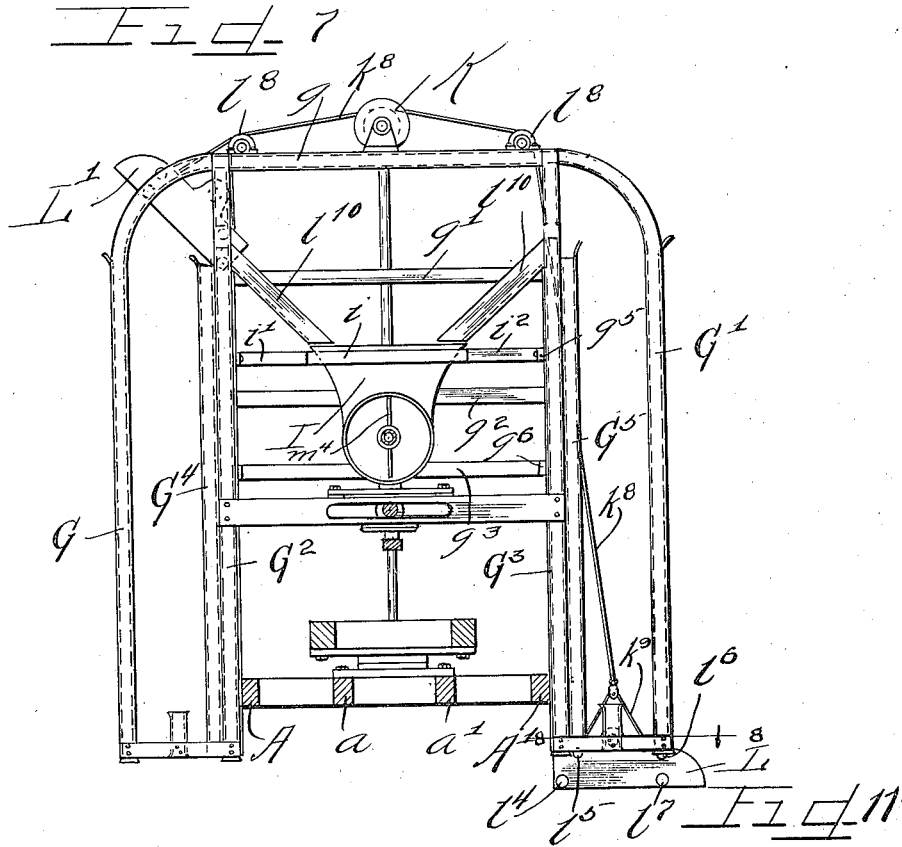
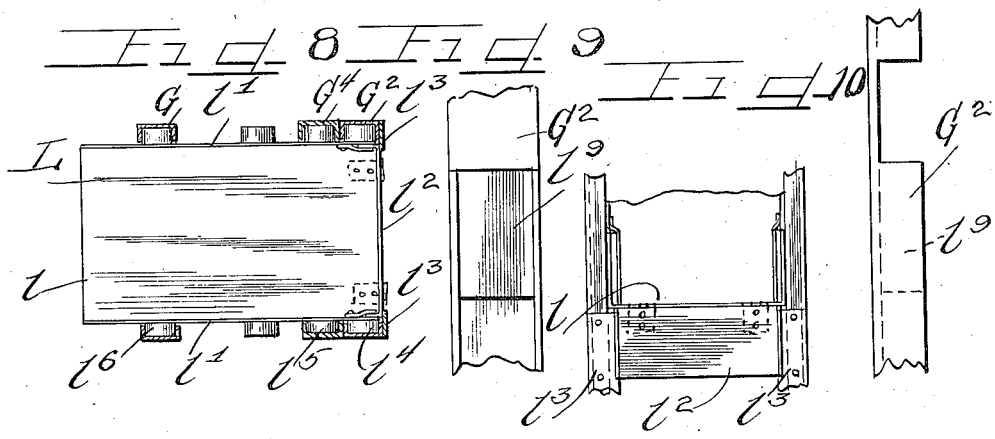
WITNESSES
J. W. Angell
R. E. Hannah
INVENTOR
Frederick E. Raleigh
by Charles W. Tims
Atty.

UNITED STATES PATENT OFFICE.

FREDERICK E. RALEIGH, OF STRONG CITY, KANSAS.

MIXER AND SPREADER FOR CONCRETE AND OTHER PLASTIC MATERIALS.

1,142,841.   Specification of Letters Patent.   Patented June 15, 1915.

Application filed February 21, 1908. Serial No. 417,011.

*To all whom it may concern:*

Be it known that I, FREDERICK E. RALEIGH, a citizen of the United States, and a resident of Strong City, in the county of Chase and State of Kansas, have invented certain new and useful Improvements in Mixers and Spreaders for Concrete and other Plastic Materials; and I do hereby declare that the following is a full, clear, and exact description of the same, reference being had to the accompanying drawings, and to the letters of reference marked thereon, which form a part of this specification.

This invention relates more particularly to that class of mixers and spreaders in which the material is automatically mixed and delivered to the point where the same is to be used and also distributed at approximately the rate and quantity required for the construction in hand.

It is an object of this invention to afford an automobile or self-propelled machine of the class described capable of moving under its own power from one job to another and of advancing itself as the work progresses, thus at all times obviating the employment of a large number of men or teams of horses for this purpose.

It is also an object of this invention to provide a machine of the class described operating under its own power and whereby the materials to be mixed are elevated and delivered automatically to a preliminary mixing chamber in which the same are thoroughly mixed dry and from which the material is delivered by gravity through a suitable conveyer to the point where the same is to be spread, during the passage through said conveyer receiving the requisite amount of water or moisture to impart the desired consistency for use.

It is also an object of the invention to provide mechanism for simultaneously mixing, wetting, and delivering through a wide arc material of the nature described and to afford in combination therewith mechanism for advancing the machine simultaneously with or independently of the operation of the mixing and delivering mechanism.

The invention embraces many novel features and consists in the matters hereinafter described and more fully pointed out and defined in the appended claims.

In the drawings: Figure 1 is a side elevation of a device embodying my invention. Fig. 2 is a top plan thereof. Fig. 3 is a central longitudinal section of the mixing chamber, conveyer and the spray pipe. Fig. 4 is an enlarged fragmentary section of the conveyer. Fig. 5 is an enlarged transverse section of the conveyer. Fig. 6 is an enlarged detail view of one of the deflectors in the conveyer. Fig. 7 is an enlarged section on line 7—7 of Fig. 1. Fig. 8 is an enlarged section on line 8—8 of Fig. 7. Fig. 9 is an enlarged detail of one of the ways for the elevator. Fig. 10 is a top plan view of the elevator bucket with the rear end released as in dumping position. Fig. 11 is an enlarged view of one of the ways at the inner end of the bucket or elevator.

As shown in the drawings: A suitable frame comprising side sills A—A' and center sills $a$—$a'$ is rigidly connected by means of end sills $a^2$—$a^3$ to afford a rigid platform, which is supported at its front end by means of any suitable fifth wheel or rotatable bearing, upon an axle B, provided with wheels $b$, and, at its rear end is supported upon an axle B' provided with traction wheels $b'$ at the ends thereof and also, as shown in Fig. 1, provided with a suitable change speed mechanism $b^2$ enabling said wheels to drive independently, if desired. As shown, a shaft C, provided with a cable drum $c$, is journaled at the rear of said front axle and is provided with a worm gear $c'$ which meshes with a worm $c^2$ on the steering standard $c^3$ at the upper end of which is provided the usual steering wheel $c^4$. As shown, cables $c^5$ connected at their ends with the axle B are turned about said drum $c$ and enable the front axle to be turned to vary the direction of movement of the device.

Supported upon the front end of the platform is a motor D, in this instance shown as an internal combustion motor such as a gasolene engine, though, of course, any suitable motor or engine may be used.

Journaled longitudinally the frame is a shaft D' having rotatably engaged thereon a worm gear $d$, which meshes at all times with a worm $d'$ on the main driving shaft of the engine. The hub of said gear $d$ is shaped to afford one member of a clutch and slidably engaged on the shaft D', is a complemental clutch member $d^2$ which, by means of a suitable lever, may be thrown into or out of engagement with said hub to rotate the shaft D′ or to permit the same to remain at rest. As shown also, a gear $d^4$ is provided on the rear end of said shaft D′ and meshes with a pinion $d^5$, on the shaft $D^2$, the rear end of which meshes with suitable gears in the differential $b^2$ in the usual or any suitable manner to enable the machine to be propelled direct from said engine. As shown, the pinion $d^5$ is rotatable on the shaft $D^2$ and the rear end of the hub thereof affords one member of a clutch, the other member $d^6$ of which is non-rotatably engaged on the shaft $D^2$, in any suitable manner and is adapted to be slid into engagement with its complemental clutch member on said pinion $d^5$ by means of a lever $d^7$. Rigidly secured on said platform is an upright, structural metal frame consisting of front and rear parallel arches, the outer members G—G′ of which consist of channel bars facing inwardly and which extend vertically to near the top of the frame and thence are curved inwardly from a center approximately above the sill A or A′ to afford an integral arch, the top of which $g$ is approximately horizontal. Extending from the top of the bend and vertically downward and rigidly bolted to the side sills A and A′ are corresponding channels $G^2$—$G^3$, and bolted or riveted on the outer flanges thereof with the webs in substantially the same plane are other channels $G^4$—$G^5$, which extend approximately to the same height as the beginning of the bend in the outer channels, thus providing three inwardly facing tracks, two of which are at the inner side of said frame and side by side, and the other of which is in the outer channel. Said frame members are rigidly connected in parallel relation by horizontal beams and struts $g'$—$g^2$—$g^3$—$g^4$—$g^5$—$g^6$, said struts $g^5$—$g^6$ being of any desired number and connecting the channel bars $G^2$—$G^3$ longitudinally of the machine, being bolted on the inner flanges of said channel bars.

Mounted upon a suitable rotatable bearing H, is a rearwardly extending frame H′ comprising rearwardly converging sills, which are connected transversely by means of saddle members $h$ $h'$—$h^2$ rigidly bolted thereto, the saddle member $h^2$ being near the forward end of said frame and the saddle member $h$ at the rearward extremity thereof. The saddle member $h^2$ is of considerable height and the saddle member $h$ at the rear end is but slightly higher than the rear end of the frame and each of said saddle members is provided with rollers $h^3$, on each side thereof which projects above the inner side of the saddle to afford a support for the conveyer $H^2$ and to facilitate rotation thereof. Fitted over the conveyer $H^2$, are semi-circular straps of steel $h^4$, which serve to bind the conveyer to its bed in said saddles. Near its upper end a gear $h^5$. is rigidly secured on said conveyer $H^2$, in mesh with a pinion $h^6$, the shaft of which is journaled in the saddle $h^2$, the forward end of which carries a beveled pinion $h^7$ which meshes with a bevel gear $h^8$, the shaft $h^9$ of which is journaled axially in the rotatable bearing H, for the frame H′. As shown also, a bevel pinion $h^{10}$, meshes with the forward side of said gear, and its shaft is provided at its extremity with a sprocket wheel about which is trained a sprocket chain $h^{11}$, which also is trained around the sprocket wheel $h^{12}$, rotatable on the shaft D′, and which may be made to rotate with said shaft by means of a clutch member $h^{13}$, adapted to be shifted by a suitable lever $h^{14}$, thus by shifting said lever, rotating the conveyer from the motor D.

Rotatably supported within the frame and with the lower end thereof in axial alinement with and extending into the conveyer $H^2$, is a hopper I, the flaring, open mouth of which is directed upwardly and is supported to rotate in an annular member $i$, rigidly secured between the ways or channels $G^2$—$G^3$ by means of beams $i'$. As shown, a suitable saddle I′ is rigidly bolted on the under side said hopper and is rotatably engaged on a bearing block $i^3$, centrally supported above the bevel gear $h^8$ and upon which said hopper may rotate with the swing of the conveyer.

Journaled at the top of the arch on the bar $g$, is a drum K, and on the forward end of the drum shaft is provided a beveled pinion $k$, which meshes at all times with the corresponding bevel pinion $k'$, rigidly secured on the upper end of the shaft $k^2$, which is journaled in suitable bearings in the beams $g'$—$g^2$ and $k^2$. A friction wheel $k^3$ is rigidly secured on the lower end of said shaft with its periphery between the connected friction disks $k^4$—$k^5$ splined on the shaft $k^6$, on which also is the driving pinion $h^{10}$, for rotating the conveyer. A suitable lever $k^7$ is pivotally engaged at a fixed point on the frame and engages a hub connecting said friction disks $k^4$—$k^5$ to shift the same to bring either into engagement with the friction wheel $k^3$ on said shaft, thus driving the shaft and drum K in either direction.

Bucket elevators are provided on each side of the machine and slidable in the ways formed by the channels G′ to $G^5$ inclusive. As shown, said elevators indicated by L comprise a bottom $l$, side walls $l'$ and a rear end $l^2$ hinged to the bottom and which normally is held closed by engagement against plates $l^3$ riveted or bolted on the inner sides of the channels $G^2$—$G^3$ respectively. At the inner end of each of said buckets and on each side thereof is journaled a roller $l^4$, adapted to run in the channels $G^2$—$G^3$ respectively. Somewhat in advance thereof and near the top of the bucket are corresponding rollers $l^5$, which track in the channel $G^4$—$G^5$ respectively and near the outer end of the bucket are journaled two rollers $l^6$—$l^7$, which track in the channels G—G' respectively. As shown, cables $k^8$ from the drum K are led over suitable idlers $l^8$ at the top of the frame and downwardly and engage suitable bails $k^9$ secured to the bucket, as shown in Fig. 7, to hoist said bucket by the operation of said drum, the one rising as the other descends. The channels $G^2$—$G^3$ are each provided with a stop $l^9$, rigidly secured therein at a point opposite the beginning of the bend in the outer channels and at which point the channels $G^4$—$G^5$ terminate, with the outer flanges thereof turned outwardly, as shown in Fig. 7. As shown also in Fig. 7, the outer flange of the channels G—G' are cut away from a point approximately at a level with said stop $l^9$ to near the point of connection with the channels $G^2$—$G^3$ with the horizontal upper frame member $g$. In operation therefore, as one of said buckets reaches maximum height, the lower, inner roller $l^4$ contacts the stop $l^9$, stopping the upward movement at the inner end of the bucket, the outer end, however, is carried upwardly, as shown in Fig. 7, and the rear end or door $l^2$ at the inner end of the bucket falls open permitting the material in the bucket to slide therefrom into the chute $l^{10}$ whereby it is directed into the hopper.

As shown, a tubular shaft M, is rigidly secured by means of diagonal members $m$—$m'$ axially of the conveyer and extends through the hopper and outwardly through a suitable stuffing box $m^2$ and affords connection with a hose pipe whereby water may be delivered to the material while passing through the conveyer. The inner end of said pipe or tubular shaft is provided with a spray head $m^3$, and, rigidly secured on said tubular shaft in the hopper, are beaters $m^4$ which serve to stir and mix the material in the hopper preliminary to delivering the same into the conveyer.

Hand holes closed by suitable plates $n$, are provided at suitable intervals in the conveyer and secured in the conveyer are adjustable deflector blades N which at their rear end are pivotally engaged in the inner wall of the conveyer and at their forward ends are provided with slotted segments $n'$ through which extend the bolts whereby said deflectors are secured in place and which permit the deflectors to be adjusted obliquely with the sides of the conveyer, if desired.

As shown in Fig. 5, said conveyers are constructed in a plurality of duplicate segments and connected by means of angle bars O, the flanges of which are riveted to the edges of the segments and the webs of which project outwardly and are adapted to be riveted or bolted together.

The operation is as follows: In propelling the machine from one location to another, of course only the steering mechanism and the levers for throwing the driving clutches into mesh need be actuated. The machine is capable of traveling from one location to another at a fair rate of speed if desired. Having positioned the machine suitably to the work, the material (which may be mixed dry in the proper proportions), is delivered into the elevator buckets and these are successively raised and lowered by means of the friction drive for the shaft $k^2$, each bucket automatically dumping when it reaches the upward limit of its movement and automatically closing to receive another load before it reaches the bottom. By throwing the clutch $h^{12}$ by means of the lever $h^{14}$, the conveyer is rotated by means of the intermeshing pinion $h^6$ and gear $h^5$. This, of course, also rotates the sprayer and mixer shaft M, mixing the material in the hopper to a certain extent and as the same passes into the conveyer delivering water thereto in the desired quantity as the material passes downwardly through the conveyer where the mixing is completed. To some extent the rate of delivery from the conveyer may be accelerated or retarded by the adjustment of the deflecting plates N. These, in any event, however, assist in mixing. As the material is delivered from the end of the conveyer, the conveyer is swung at a suitable rate across the area of operation. The range of operation of course, depends to a certain extent upon the length of the conveyer and its amplitude of lateral movement. The conveyer may be swung manually as the material is required or if desired, this may be actuated by means of suitable connection with the motor. Usually, however, inasmuch as the conditions of surface may require some variation in quantity at different points, in the work, the conveyer is swung by hand and in this way the material is distributed as required, the machine moving ahead under its own power whenever necessary, or desirable to facilitate the work.

Of course, I am aware that the material may be delivered to the elevators in a mixed and wet condition or may be mixed and have water applied while in the elevator buckets, if desired. Of course, too, other forms of elevators may be provided should they be preferred and many details in relation to the driving connections may be varied. I therefore do not purpose limiting this application for patent otherwise than necessitated by the prior art, inasmuch as I have shown but one of several embodiments of my invention.

I claim as my invention:

In a device of the class described a mixing hopper, a mixing cylinder connected therewith to receive material therefrom, mixing blades within said cylinder, a tubular shaft extending through said mixing hopper and into said cylinder, a sprayhead on the end of said shaft acting to distribute a liquid toward said blades and upon the material in said cylinder, a rigid connection between said cylinder and said shaft whereby the same is rotated by said cylinder, and mixing blades secured to said shaft on the portion within said hopper to mix the material within said hopper prior to its introduction into the cylinder.

In testimony whereof I have hereunto subscribed my name in the presence of two subscribing witnesses.

FREDERICK E. RALEIGH.

Witnesses:
C. W. HILLS,
J. P. MACGILLIVRAY.